June 2, 1959  C. HUDKINS  2,888,773
FISHING BOBBER HAVING TEMPORARY LINE RETAINING MEANS
Filed Sept. 15, 1955

Clyde Hudkins
INVENTOR.

BY *Clarence A. O'Brien*
*and Harvey B. Jacobson*
Attorneys

United States Patent Office 2,888,773
Patented June 2, 1959

2,888,773

FISHING BOBBER HAVING TEMPORARY LINE RETAINING MEANS

Clyde Hudkins, Wheeling, W. Va.

Application September 15, 1955, Serial No. 534,541

2 Claims. (Cl. 43—43.11)

This invention relates in general to new and useful improvements in fishing equipment, and more specifically to an improved fishing bobber having line retaining means incorporated therein.

In order to fish a distance off shore and at the same time maintain the hook and bait a desired distance above the bottom, it has been the general practice to utilize a bobber. However, in utilizing a bobber, one of the main problems is that of casting the fishing line to the desired spot. If a bobber is merely inserted in the fishing line a distance from the hook, then, it will be impossible to reel the fishing line in to the extent where the hook does not dangle in a dangerous position. On the other hand, if the depending portion of the fishing line is wound on the bobber and cast out therewith, then the fishing line will not come loose from the bobber so that the hook will depend below the bobber. It is therefore the primary object of this invention to provide an improved fishing bobber which has incorporated therein means for temporarily retaining a line so that a depending portion of a fishing line may be secured to the bobber during casting and will automatically be released upon the striking of water by the bobber.

Another object of this invention is to provide an improved fishing bobber which is so constructed whereby it may be quickly and easily positioned on a fishing line and adjusted relative thereto without requiring the tying of the fishing line to the bobber.

A further object of this invention is to provide an improved fishing bobber which is so constructed whereby a fishing line may be temporarily retained thereto during casting and will become disengaged therefrom upon the striking of the water by the bobber, the bobber being so constructed whereby it may be weighted as desired for casting.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
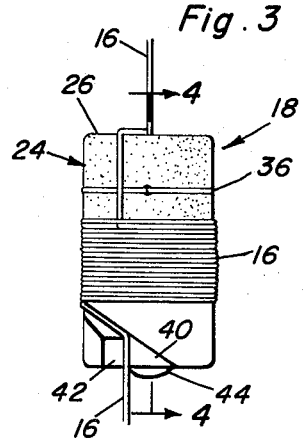
Figure 3 is a side elevational view of the fishing bobber on a large scale and shows the same having the depending portion of the fishing line reeled thereabout for casting.
Figure 4:
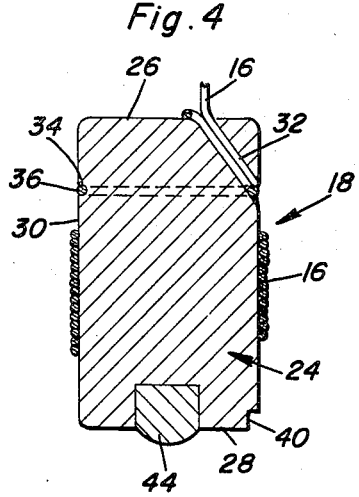
Figure 5:
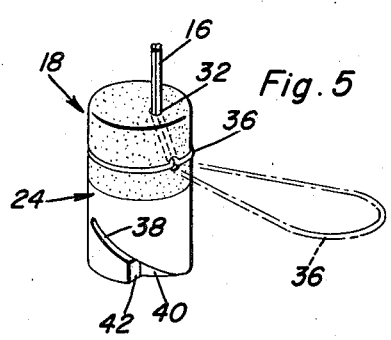

Figure 4 is an enlarged vertical sectional view taken substantially upon the plane indicated by the section line 4—4 of Figure 3 and shows further the details of the construction of the fishing bobber and the relationship of the fishing line with respect thereto; and Figure 5 is an enlarged perspective view of the fishing bobber and shows the manner in which the fishing line is adjustably secured thereto, the fishing line being shown in an initial position by broken lines.

Referring now to the drawings in detail, it will be seen that there is illustrated a fishing assembly which is referred to in general by reference numeral 10. The fishing assembly 10 includes a conventional rod 12 and a reel 14. Carried by the reel 14 and threaded through the guide of the rod 12 is a fishing line 16. The fishing line 16 has incorporated thereon the fishing bobber, which is the subject of this invention, the bobber being referred to in general by the reference numeral 18. Carried at the lower free end of the fishing line 16 is a fishing hook 20 and, if desired, a small weight 22.

Referring now to Figures 2 through 5, inclusive, it will be seen that the fishing bobber 18 includes a body member 24 which is generally cylindrical in outline. The body member 24 includes an upper end 26, a lower end 28 and a peripheral vertical wall 30. While the body member 24 has been illustrated and described as being cylindrical in outline, it is to be understood that it may have other desired outlines such as are commonly found in bobbers of various types.

In order that the fishing line 16 may be conveniently secured to the bobber 18, there is formed in the upper part of the bobber 18, as is best illustrated in Figure 4, a sloping bore 32. The bore 32 opens through the upper end 26 and through an upper part of the peripheral wall 30. It is to be noted that the bore 32 is offset from the center of the upper end 26.

Formed in the peripheral wall 30 adjacent the upper end thereof is an annular recess 34. The recess 34 intersects the lower end of the bore 32 at its intersection with the peripheral wall 30.

When it is desired to mount the fishing bobber 18 on the fishing line 16 intermediate the ends thereof, an intermediate portion of the fishing line 16 is grasped and doubled on itself. It is then passed downwardly through the bore 32 from the upper end thereof. After the intermediate portion of the fishing line 16 is passed through the bore 32, that portion of the fishing line 16 disposed through the bore 32 is then opened up to form a loop 36, as is best illustrated in Figure 5. The loop 36 is then passed around the lower part of the body member 24 and up into alignment with the recess 34. That portion of the fishing line 16 disposed above the bobber 18 is then pulled so as to seat the loop 36 in the recess 34.

After the fishing bobber 18 has been properly positioned on the fishing line 16, one end of the fishing line 16 will extend up to the rod 12 and the opposite end will be disposed in depending relation, the opposite end carrying the hook 20. In order to adjust the bobber 18 on the fishing line 16 so that amount of fishing line depending from the bobber 18 may be varied, it is merely necessary to pull on the desired portion of the fishing line 16 to move the bobber 18 accordingly.

Formed in the lower part of the bobber 18 is a spiral recess 38. This recess is cut through the peripheral wall 30 and opens up at its lower end into a vertical recess 40 which extends through the lower end 28. The intersection of the recess 40 with the recess 38 forms a shoulder 42.

Figure 1:
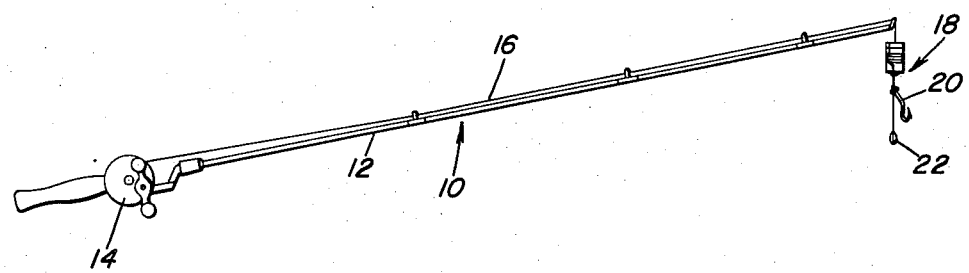
Figure 1 is a side elevational view of a fishing reel and rod having incorporated thereon a fishing line and fishing bobber which is the subject of this invention.
Figure 2:
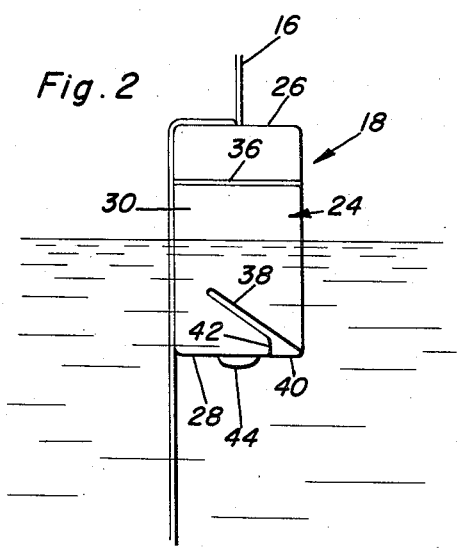
Figure 2 is an enlarged elevational view of the fishing bobber showing it positioned in the water for supporting a hook at a desired distance below the surface of the water.

That portion of the fishing line 16 which depends below the bobber 18 is wound upon the peripheral wall 30, as is best illustrated in Figures 3 and 4. The extreme lower end of the depending portion of the fishing line 16 is then seated in the recess 38 and bears against the shoulder 42, the weight of the hook 20 and the small weight 22 retaining the fishing line in engagement with the shoulder 42. The fishing assembly 10 is then returned to the position illustrated in Figure 1 for casting. As the fishing line 16 is cast in the normal manner, the bobber 18 will pay out the line 16. When the bobber 18 strikes the water, due to its up and down motion, the fishing line 16 will become disengaged from the shoulder 42 and move out of the recesses 38 and 40. At that time, the fishing line will then move downwardly so as to position the hook 20 at the desired depth.

It is to be understood that the bobber 18 may be formed of any suitable material, although wood is preferred because of its cheapness. In order that the bobber 18 may be of the desired weight for a fishing casting, if desired, it may be provided with a small weight 44. The weight 44 is positioned in the lower end of the body member 24 and projects downwardly through the lower end 28 thereof. The weight 44 may be varied as desired.

From the foregoing description of the present invention, it will be readily apparent that there has been devised a relatively simple fishing bobber which is so constructed whereby a depending portion of the fishing line may be conveniently reeled thereon and temporarily retained relative thereto. Also, the fishing bobber is of such a construction whereby it may be secured to a fishing line without requiring the tying of any knots whatsoever in the fishing line. Further, the bobber is so connected to the fishing line whereby it may be readily adjusted with a minimum of trouble.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishing bobber comprising an upright floatable body member, said body member having upper and lower ends and a peripheral vertical wall, a weight carried by said lower end for retaining said body member upright, means at said upper end for anchoring an intermediate portion of a fishing line, and means at said lower end for temporarily anchoring a depending portion of the fishing line, said first mentioned means including a bore extending through said upper end and an upper part of said peripheral wall, an annular recess in said peripheral wall intersecting said bore at its intersection with said peripheral wall, said second mentioned means including a spiral recess in said peripheral wall, said spiral recess having a lower end terminating in a vertical recess opening through said lower end.

2. A fishing line and bobber assembly comprising a bobber including an upright floatable body member having upper and lower ends and a peripheral vertical wall, a weight carried by said lower end for retaining said body member upright, a bore extending through said upper end and said peripheral wall, an annular recess in said peripheral wall intersecting said bore at its intersection with said peripheral wall, a fishing line having an intermediate portion passing through said bore from said upper end, said intermediate portion terminating in a loop recessed in said annular recess, said fishing line including a free end portion wound about said peripheral wall, a spiral recess formed in said peripheral wall adjacent said lower end, an end part of said free end portion being seated in said spiral recess to retain said free end portion on said body member during a casting operation.

References Cited in the file of this patent
UNITED STATES PATENTS

| | | |
|---|---|---|
| 1,512,656 | Ward | Oct. 21, 1924 |
| 1,918,507 | Westling | July 18, 1933 |
| 2,262,974 | Steiner | Nov. 18, 1941 |
| 2,269,615 | Walker | Jan. 13, 1942 |
| 2,536,414 | Beard | Jan. 2, 1951 |
| 2,599,973 | Bujaky | June 10, 1952 |
| 2,712,197 | Lewis | July 5, 1955 |
| 2,722,768 | Fleetwood | Nov. 8, 1955 |